United States Patent [19]

Bradley

[11] Patent Number: 4,997,063
[45] Date of Patent: Mar. 5, 1991

[54] COLLAPSIBLE AND ADJUSTABLE TREE STAND

[76] Inventor: Ralph E. Bradley, 219 Mobile St., Aberdeen, Mich. 39730

[21] Appl. No.: 514,950

[22] Filed: Apr. 26, 1990

[51] Int. Cl.⁵ .......................... A45F 3/26; A47C 9/10; A01M 31/02
[52] U.S. Cl. .................................. 182/187; 182/136; 108/152
[58] Field of Search ............... 182/187, 188, 136, 133; 108/152

[56] References Cited

U.S. PATENT DOCUMENTS

| 4,161,233 | 7/1979 | Wirtz | 182/187 |
| 4,337,844 | 7/1982 | Hice | 182/187 |
| 4,549,633 | 10/1985 | Merritt | 182/187 |

Primary Examiner—Reinaldo P. Machado
Attorney, Agent, or Firm—Jennings, Carter, Thompson & Veal

[57] ABSTRACT

A tree stand having a weight bearing platform and a gripping frame hingedly joined thereto utilizes a pair of variable length suspension braces connecting the outer end of the platform to the gripping frame. By varying the length of the braces the platform is leveled while positioned on the tree. The hinged construction also allows for easy folding of the stand for storage and transportation.

16 Claims, 3 Drawing Sheets

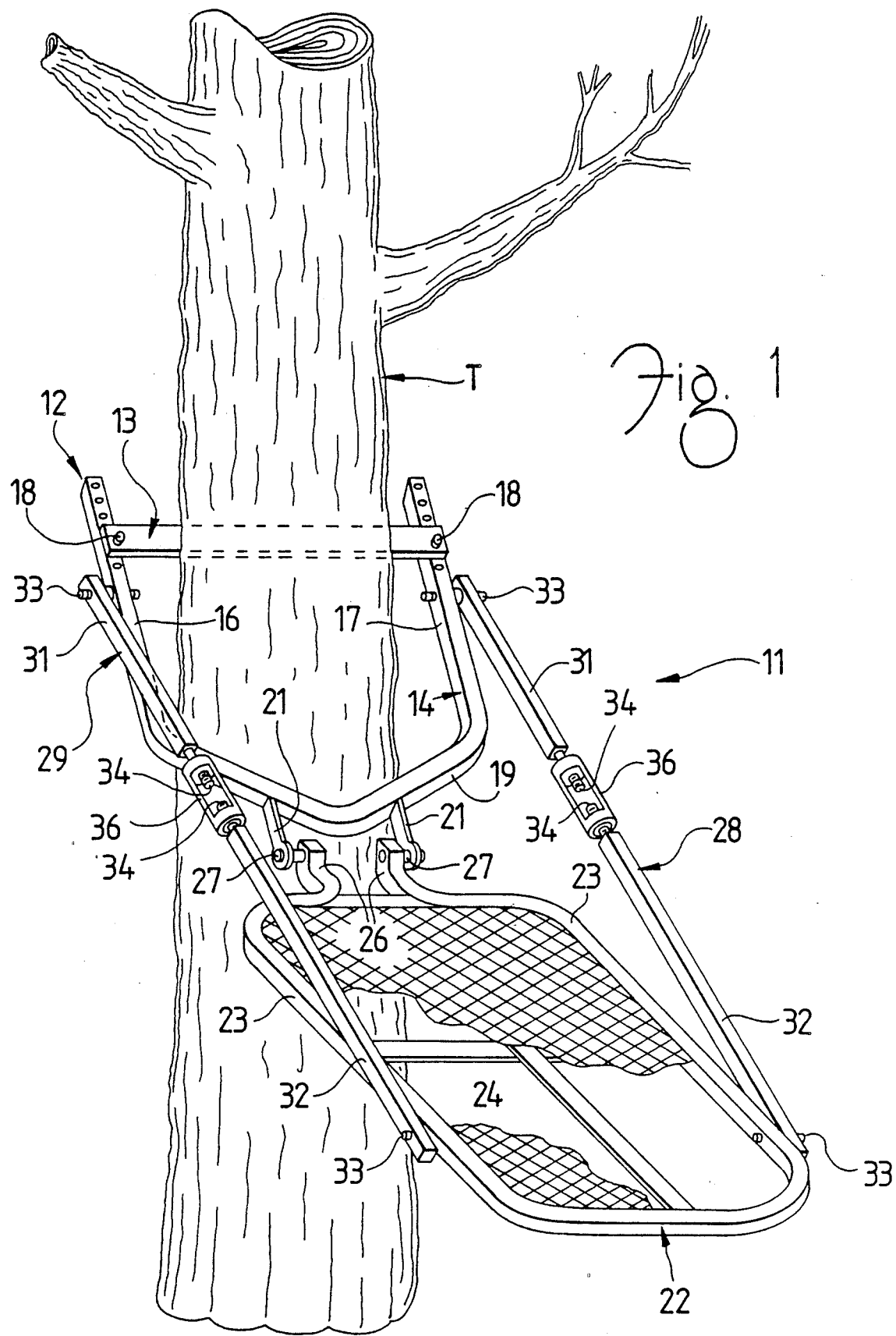

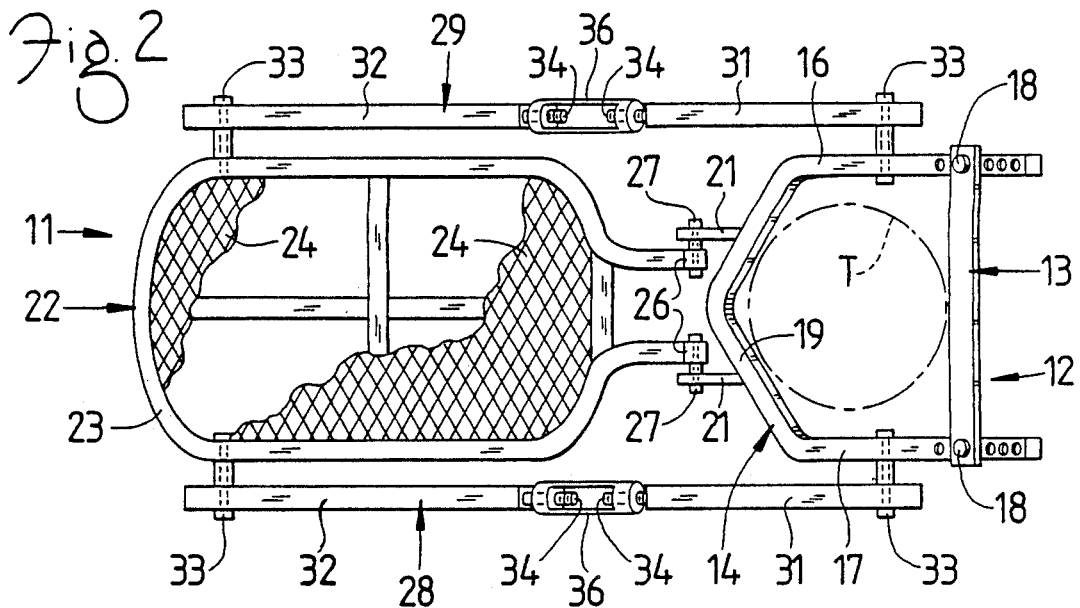
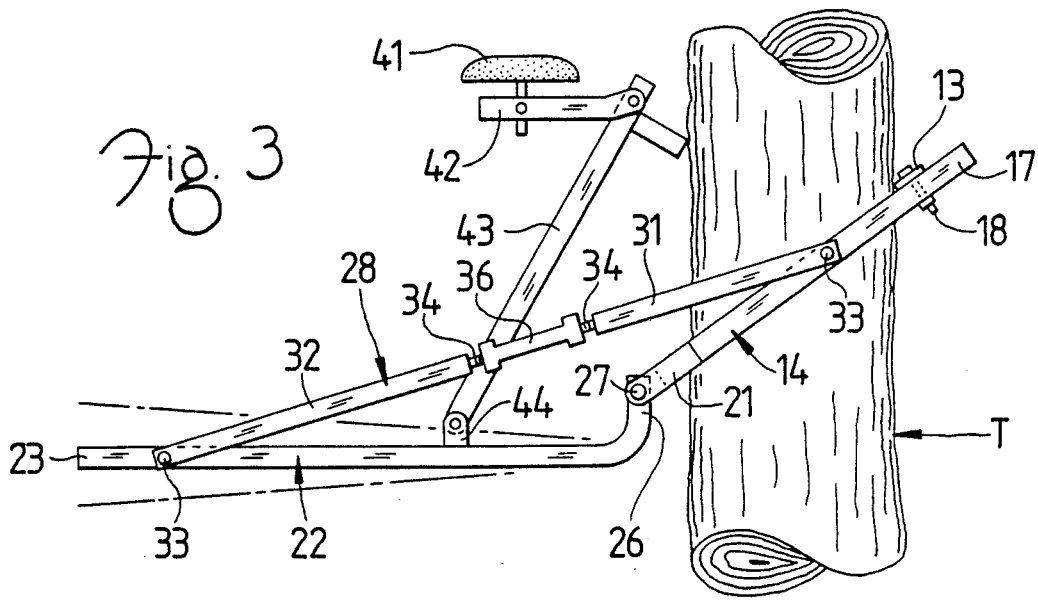
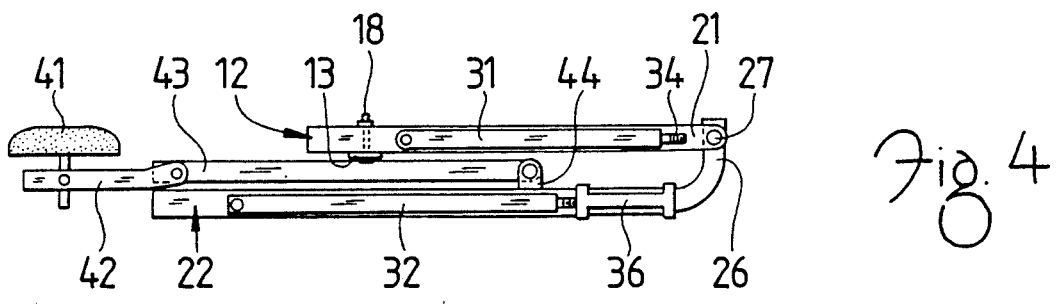

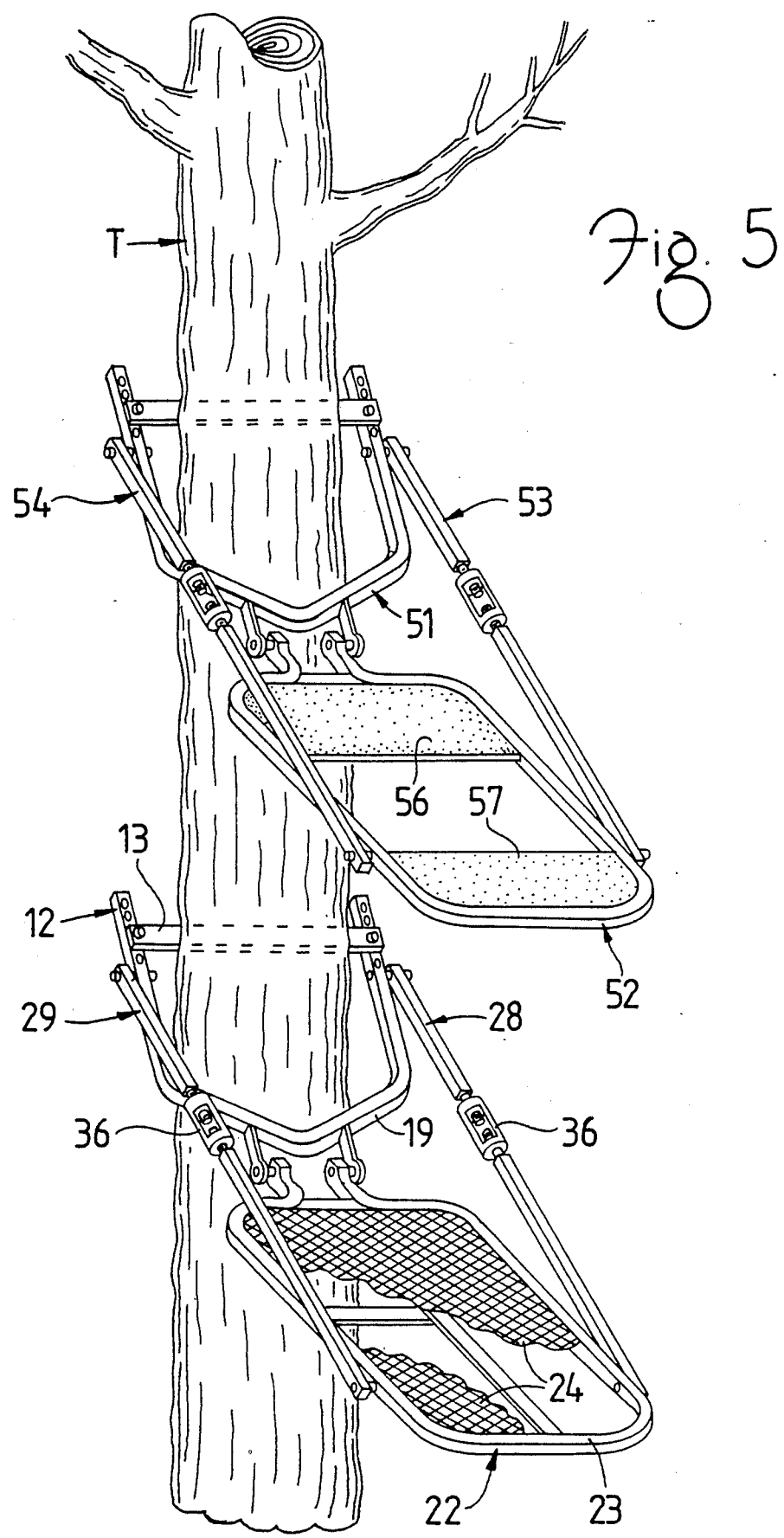

COLLAPSIBLE AND ADJUSTABLE TREE STAND

FIELD OF THE INVENTION

The present invention relates to elevational platforms in the nature of tree stands such as are used for hunting. More particularly the present invention relates to tree stands which have a gripping portion encircling the tree to support the platform and a means for leveling the platform while at an elevation in the tree. In even greater particularity the present invention relates to a climbing tree stand which has an adjustable brace member, the length of which is variable to level the platform.

BACKGROUND OF THE INVENTION

The relevant art is replete with tree stands of various descriptions. Many of the stands employ a flexible belt or chain that is used to secure a seat to a tree. Others use a rigid frame which encircles a tree and engages the tree by virtue of the weight of the stand or through the use of spikes or blades which penetrate the bark of the tree and ostensibly hold the stand in position. All of the rigid tree stands currently on the market share a common drawback. The stands are not adjustable to provide a level and stable platform for the hunter. Consequently, the hunter is forced to remain in an uncomfortable position which has substantial potential for causing him to unexpectedly loose his balance and fall from the stand. Countless hunters are injured each year by falling out of tree stands. In my copending Pat. application Ser. No. 07/487,384, I provided one way to level the stand by moving the base of the platform closest to the tree. Although the stands, built in accordance with the teaching of my copending application, are vastly superior to those stands which have no leveling feature, there remains a need for a stand which can be easily leveled in the tree and which is collapsible for easy transport to the site of the tree.

SUMMARY OF THE INVENTION

It is the object of the present invention to provide a tree stand which easily, quickly, and safely leveled when placed at any elevation in a tree.

It is the further object of the invention to improve the safety of the hunter using such a tree stand by providing a level platform which will not promote his losing his balance.

Yet another object of the invention is to make the tree stand easier to transport to the location of the tree in which the stand is supported.

These and other objects of my invention are advantageously accomplished by my unique utilization of a pair of braces which can also serve as a leveling means without danger of disengagement. My new tree stand uses a gripping member which does not need to penetrate the back of the tree. The gripping member is a rigid frame which can be placed around the tree and positioned obliquely on the tree such that a lower portion and an upper portion engage the tree on opposite sides thereof. A rigid platform is hingedly attached to the lower portion such that the platform may be positioned adjacent and parallel to the frame or at an extended angle relative thereto. The brace members are connected to the frame near the upper portion and to the platform outwardly from the tree and are adjustable in length such that the outer end of the platform is adjustable in height, thus the platform may be leveled by varying the height of the outer end.

Other advantageous features and improvements present in my invention may be discerned from the accompanying Drawing and Description.

BRIEF DESCRIPTION OF THE DRAWINGS

Apparatus embodying features of my invention are depicted in the accompanying drawings which form a portion of this disclosure and wherein:

FIG. 1 is a perspective view of one embodiment of my invention attached to a tree with the platform shown partially away;

FIG. 2 is a plan view of the stand as shown in FIG. 1;

FIG. 3 is a side elevational view of a second embodiment of the invention;

FIG. 4 is a side elevational view of the invention in a folded compact state; and FIG. 5 is a perspective view of the invention configured as a "sit and climb" tree stand.

DESCRIPTION OF THE PREFERRED EMBODIMENTS

Referring to the drawings for a fuller understanding of my invention, it may be seen in FIG. 1, that my invention is a tree stand shown generally at 11 which is to be supported by a tree T. The stand 11 engages the tree by a gripping frame 12 which includes a back bar 13 and a front bar 14. The front bar 14 actually includes a pair of side extension 16 and 17, which are detachably connected or with a bolt or pin 18 to the back bar 13, and which are joined by a tree engaging V-shaped portion 19. The gripping frame 12 is substantially rigid and lies generally in a plane. That is to say, it is not intended to be warped or to flexibly conform to the surface of the tree.

Extending within the plane of the frame from the v-shaped portion 19 are a pair of mounting elements 21 which form one half of a hinge connection between the gripping frame 19 and a platform 22. The platform 22 includes a rigid peripheral frame 23 and a weight bearing surface 24, which may be made of expanded metal or the like. Cooperatively positioned to extend from the peripheral frame 23 are a pair of mounting members 26 which form the second half of the hinge connection, and which are hingedly joined to mounting elements 2; by hinge pins 27. It is note worthy to mention that mounting elements 21 and mounting members 26 may be located in any convenient manner on the frame's to enable the gripping frame 12 and peripheral frame 23 to fold from a substantially parallel abutting position as shown in FIG. 4 to an extended position wherein the frames are held at an obtuse angle as shown in FIG. 1.

The platform 22 is generally elongated and is supported at the ends thereof away from the tree by a set of braces 28 and 29. Each brace 28 and 29 has an upper elongated member 31 and a lower elongated member 32. The upper elongated members 31 are pivotally attached at the upper end to the side extensions 17 by a pin and bushing combination 33 such that the elongated member 32 is movable about the axis of the pin combination 33 but is not detachable from the gripping frame 12. Likewise the lower elongated member 32 is pivotally affixed to the peripheral frame 23 near the outer end thereof. Each elongated member 31 or 32 has formed on the free end thereof a threaded extension 34 onto which a rotatable sleeve 36 is threadedly mounted to form a turnbuckle which connects the elongated members to form a rigid brace 28 or 29 of variable length such that the angle between the gripping frame and peripheral frame may be varied.

FIGS. 3 and 4 show a first variation in my tree stand. In this embodiment I have added a seat 41 for the user to rest on. The seat 41 is supported on an arm 42 pivotally mounted to a support 43 which is hingedly connected to the peripheral frame 23 at hinge 44. A stop 45 mounted proximal the end of the support 43 rearwardly of the seat may rest against the tree as shown. As may be seen in FIG. 4 the stand may be folded into a compact unit for storage or transportation.

In FIG. 5 it may be seen that my apparatus can be configured as a sit and climb tree stand wherein a second gripping frame 51 is hingedly connected to a second peripheral frame 52 which is supported by braces 53 and 54. The peripheral frame 52 supports dual weight bearing surfaces 56 and 57 positioned as is well known in the tree climber industry.

Regardless of which of the foregoing embodiments are chosen it may readily be seen that unlikely conventional tree stands, my gripping frame 12 does not have to be adjusted to level the tree stand once the user has reached his selected elevation. It will be appreciated by experienced tree climbers that a tree may be several inches smaller in diameter at the selected height than the bottom, thus the angle of engagement of the gripping frame, being dependent on the size of the tree changes during the assent. With my new tree stand the user need only position his tree stand at the selected height and rotate the turnbuckle to vary the length of the braces to level the platform. Each turnbuckle will include retainers such as cotter pins or ring pins insertable throughout the threaded portion of the elongated member to prevent inadvertent disengagement. These pins may be removed to fold the stand for transport or storage as shown in FIG. 1 While I have shown my invention in various forms, it will be obvious to those skilled in the art that it is not so limited but is susceptible of various changes and modifications without departing from the spirit thereof.

What I claim is:

1. An apparatus for use as a tree stand comprising:
   (a) grip means for detachably engaging a tree at various diameters said grip means being inclined when in positive engagement with said tree to present a lower portion on a forward side of said tree and an upper portion on an opposite side of said tree:
   (b) platform means hingedly attached to said lower portion for supporting a person at an elevation on a tree;
   (c) brace means pivotally affixed to said grip means proximal said upper portion and pivotally affixed to said platform means distal said tree for supporting said platform means and including means for varying the length of said brace means while said brace means is affixed to said grip means and said platform means.

2. Apparatus as defined in claim 1 wherein said brace means comprises:
   (a) a first elongated member pivotally affixed to said grip means at one end and operably connected to said varying means at a second end;
   (b) a second elongated member operably connected to said varying means at one end and pivotally connected to said platform means at a second end such that said first and second elongated members and said varying means form a substantially rigid connection between said grip means and said platform means.

3. Apparatus as defined in claim 2 wherein said varying means comprises a turnbuckle assembly including a rotatable sleeve member operably connected to said first and second elongated members such that rotation of the sleeve member in a first angular direction urges said first and second elongated members toward each other and rotation of the sleeve member in an opposite angular direction urges said first and second elongated members away from each other.

4. Apparatus as defined in claim 1 wherein said varying means comprises a turnbuckle assembly including a rotatable sleeve member rotation of which varies the angular separation between said grip means and said platform means by varying the length of said brace means.

5. Apparatus as defined in claim 4 wherein said brace means comprises:
   (a) a first elongated member pivotally mounted at one end thereof to said grip means for movement about a horizontal axis and threadably connected to said sleeve member at a second end;
   (b) a second elongated member pivotally mounted at one end thereof to said platform means and threadably connected to said sleeve member at a second end.

6. Apparatus as defined in claim 2 wherein said platform means comprises:
   (a) a rigid frame extending outwardly from said tree, and a weight bearing surface supported in said frame.

7. Apparatus as defined in claim 6 further comprising at least one mounting member affixed to said frame and extending toward said gripping means and at least one mounting element affixed to said gripping means and extending therefrom with said mounting member and mounting element being hingedly joined for rotation about a common horizontal axis.

8. Apparatus as defined in claim 6 further comprising:
   (a) an elongated member pivotally mounted at one end thereof to said frame for movement about an axis parallel to said weight bearing surface and supporting at a second end thereof a seat member with said elongated member being selectively positioned to abut said tree at said second end to support a user on said seat.

9. Apparatus as defined in claim 7 wherein said varying means comprises a turnbuckle assembly including a rotatable sleeve member rotation of which varies the angular separation between said grip means and said platform means by varying the length of said brace means.

10. Apparatus as defined in claim 5 wherein varying means comprises a turnbuckle assembly including a rotatable sleeve member rotation of which varies the angular separation between said grip means and said platform means by varying the length of said brace means.

11. Apparatus as defined in claim 6 wherein varying means comprises a turnbuckle assembly including a rotatable sleeve member rotation of which varies the angular separation between said grip means and said platform means by varying the length of said brace means.

12. Apparatus as defined in claim 11 wherein said weight bearing surface is substantially co-extensive with said frame and further comprising:

(a) a second grip means positioned on said tree at an elevation above said grip means; and (b) a second platform means hingedly affixed by said second grip means and second brace means including varying means connecting said second grip means and said second platform means.

13. A collapsible tree stand comprising:

(a) rigid means for gripping a tree by circumscribing the tree in a plane and apply opposing force to a front and a rear side of the tree at different elevations on the tree;

(b) platform means hingedly mounted to said gripping means along a side thereof proximal the front of said tree for supporting the weight of a user;

(c) said platform means being selectively pivotally movable to a position parallel to and substantially abutting said gripping means and to a position transverse the plane of said gripping means; and (d) brace means pivotally connected to said gripping means and said platform means for supporting an outer end of said platform means at a selected angle relative to said gripping means, said brace means being variable in length to vary said angle.

14. A tree stand as defined in claim 13 wherein said brace means comprises:

(a) at least one upper elongated member pivotally mounted at one end thereof to said gripping means and at least one lower elongated member pivotally mounted at one end thereof to said platform means distal said tree; and (b) means for releasably attaching said upper and lower elongated members to form a rigid brace of a selected length between said gripping means and said platform means.

15. Apparatus as defined in claim 13 wherein said platform means comprises:

(a) a rigid frame extending outwardly from said tree, and a weight bearing surface supported on said frame.

16. Apparatus as defined in claim 12 wherein varying means comprises a turnbuckle assembly including a rotatable sleeve member rotation of which varies the angular separation between said grip means and said platform means by varying the lenghth of said brace means.

* * * * *